US007182166B2

(12) United States Patent
Gray et al.

(10) Patent No.: US 7,182,166 B2
(45) Date of Patent: Feb. 27, 2007

(54) FOOTREST TUCK MECHANISM

(75) Inventors: Larry B. Gray, Merrimack, NH (US); Matthew A. Norris, Londonderry, NH (US)

(73) Assignee: Deka Products Limited Partnership, Manchester, NH (US)

( * ) Notice: Subject to any disclaimer, the term of this patent is extended or adjusted under 35 U.S.C. 154(b) by 272 days.

(21) Appl. No.: 10/806,755

(22) Filed: Mar. 23, 2004

(65) Prior Publication Data

US 2005/0211477 A1 Sep. 29, 2005

(51) Int. Cl.
*B62D 61/12* (2006.01)

(52) U.S. Cl. ....................................... 180/209; 180/907

(58) Field of Classification Search .................. 180/21, 180/22, 209, 907; 280/DIG. 10
See application file for complete search history.

(56) References Cited

U.S. PATENT DOCUMENTS

| | | | |
|---|---|---|---|
| 584,127 | A | 6/1897 | Draullette et al. |
| 849,270 | A | 4/1907 | Schafer et al. |
| 2,742,973 | A | 4/1956 | Johannesen |
| 3,145,797 | A | 8/1964 | Taylor |
| 3,260,324 | A | 7/1966 | Suarez |
| 3,283,398 | A | 11/1966 | Andren |
| 3,288,234 | A | 11/1966 | Feliz |
| 3,348,518 | A | 10/1967 | Forsyth et al. |
| 3,374,845 | A | 3/1968 | Selwyn |
| 3,399,742 | A | 9/1968 | Malick |
| 3,446,304 | A | 5/1969 | Alimanestiano |
| 3,450,219 | A | 6/1969 | Fleming |
| 3,515,401 | A | 6/1970 | Gross |
| 3,580,344 | A | 5/1971 | Floyd |
| 3,596,298 | A | 8/1971 | Durst, Jr. |
| 3,860,264 | A | 1/1975 | Douglas et al. |
| 3,872,945 | A | 3/1975 | Hickman et al. |
| 3,952,822 | A | 4/1976 | Udden et al. |
| 4,018,440 | A | 4/1977 | Deutsch |
| 4,062,558 | A | 12/1977 | Wasserman |
| 4,076,270 | A | 2/1978 | Winchell |
| 4,088,199 | A | 5/1978 | Trautwein |

(Continued)

FOREIGN PATENT DOCUMENTS

| | | |
|---|---|---|
| DE | 2 048 593 | 5/1971 |

(Continued)

OTHER PUBLICATIONS

Kawaji, S., *Stabilization of Unicycle Using Spinning Motion*, Denki Gakkai Ronbushi, D, vol. 107, Issue 1, Japan (1987), pp. 21-28.

(Continued)

*Primary Examiner*—Paul N. Dickson
*Assistant Examiner*—Tiffany L. Webb
(74) *Attorney, Agent, or Firm*—Bromberg & Sunstein LLP

(57) ABSTRACT

A wheelchair with a footrest that tucks as a power base on which the wheelchair seat is mounted rotates about an axis parallel to a surface. The rotation of the power base raises the height of the seat above the surface. The footrest, which is coupled to the support, tucks towards the power base and still avoids obstacles on the surface. The footrest tuck improves the maneuverability of the wheelchair by reducing the radius about which the footrest swings as the wheelchair turns.

7 Claims, 6 Drawing Sheets

U.S. PATENT DOCUMENTS

| | | | | |
|---|---|---|---|---|
| 4,094,372 | A | | 6/1978 | Notter |
| 4,109,741 | A | | 8/1978 | Gabriel |
| 4,111,445 | A | | 9/1978 | Haibeck |
| 4,151,892 | A | | 5/1979 | Francken |
| 4,222,449 | A | | 9/1980 | Feliz |
| 4,264,082 | A | | 4/1981 | Fouchey, Jr. |
| 4,266,627 | A | | 5/1981 | Lauber |
| 4,293,052 | A | | 10/1981 | Daswick et al. |
| 4,325,565 | A | | 4/1982 | Winchell |
| 4,354,569 | A | | 10/1982 | Eichholz |
| 4,363,493 | A | | 12/1982 | Veneklasen |
| 4,373,600 | A | | 2/1983 | Buschbom et al. |
| 4,375,840 | A | | 3/1983 | Campbell |
| 4,510,956 | A | | 4/1985 | King |
| 4,560,022 | A | | 12/1985 | Kassai |
| 4,566,707 | A | | 1/1986 | Nitzberg |
| 4,570,078 | A | | 2/1986 | Yashima et al. |
| 4,571,844 | A | | 2/1986 | Komasaku et al. |
| 4,618,155 | A | * | 10/1986 | Jayne ........................ 280/5.28 |
| 4,624,469 | A | | 11/1986 | Bourne, Jr. |
| 4,657,272 | A | | 4/1987 | Davenport |
| 4,685,693 | A | | 8/1987 | Vadjunec |
| 4,709,772 | A | | 12/1987 | Brunet |
| 4,716,980 | A | | 1/1988 | Butler |
| 4,740,001 | A | | 4/1988 | Torleumke |
| 4,746,132 | A | | 5/1988 | Eagan |
| 4,770,410 | A | | 9/1988 | Brown |
| 4,786,069 | A | | 11/1988 | Tang |
| 4,790,400 | A | | 12/1988 | Sheeter |
| 4,790,548 | A | | 12/1988 | Decelles et al. |
| 4,794,999 | A | | 1/1989 | Hester |
| 4,798,255 | A | | 1/1989 | Wu |
| 4,802,542 | A | | 2/1989 | Houston et al. |
| 4,809,804 | A | | 3/1989 | Houston et al. |
| 4,834,200 | A | | 5/1989 | Kajita |
| 4,863,182 | A | | 9/1989 | Chern |
| 4,867,188 | A | | 9/1989 | Reid |
| 4,869,279 | A | | 9/1989 | Hedges |
| 4,874,055 | A | | 10/1989 | Beer |
| 4,890,853 | A | | 1/1990 | Olson |
| 4,919,225 | A | | 4/1990 | Sturges |
| 4,953,851 | A | | 9/1990 | Sherlock et al. |
| 4,984,754 | A | | 1/1991 | Yarrington |
| 4,985,947 | A | | 1/1991 | Ethridge |
| 4,998,596 | A | | 3/1991 | Miksitz |
| 5,002,295 | A | | 3/1991 | Lin |
| 5,011,171 | A | | 4/1991 | Cook |
| 5,052,237 | A | | 10/1991 | Reimann |
| 5,111,899 | A | | 5/1992 | Reimann |
| 5,158,493 | A | | 10/1992 | Morgrey |
| 5,168,947 | A | | 12/1992 | Rodenborn |
| 5,171,173 | A | | 12/1992 | Henderson et al. |
| 5,186,270 | A | | 2/1993 | West |
| 5,221,883 | A | | 6/1993 | Takenaka et al. |
| 5,241,875 | A | | 9/1993 | Kochanneck |
| 5,248,007 | A | | 9/1993 | Watkins et al. |
| 5,314,034 | A | | 5/1994 | Chittal |
| 5,350,033 | A | | 9/1994 | Kraft |
| 5,366,036 | A | | 11/1994 | Perry |
| 5,376,868 | A | | 12/1994 | Toyoda et al. |
| 5,419,624 | A | | 5/1995 | Adler et al. |
| 5,577,567 | A | * | 11/1996 | Johnson et al. ............ 180/9.23 |
| 5,701,965 | A | | 12/1997 | Kamen et al. |
| 5,701,968 | A | | 12/1997 | Wright-Ott et al. |
| 5,775,452 | A | | 7/1998 | Patmont |
| 5,791,425 | A | | 8/1998 | Kamen et al. |
| 5,794,730 | A | | 8/1998 | Kamen |
| 5,971,091 | A | | 10/1999 | Kamen et al. |
| 5,973,463 | A | | 10/1999 | Okuda et al. |
| 5,975,225 | A | * | 11/1999 | Kamen et al. ............... 180/7.1 |
| 5,986,221 | A | | 11/1999 | Stanley |
| 6,003,624 | A | | 12/1999 | Jorgensen et al. |
| 6,039,142 | A | | 3/2000 | Eckstein et al. |
| 6,050,357 | A | | 4/2000 | Staelin et al. |
| 6,059,062 | A | | 5/2000 | Staelin et al. |
| 6,125,957 | A | | 10/2000 | Kauffmann |
| 6,131,057 | A | | 10/2000 | Tamaki et al. |
| 6,223,104 | B1 | | 4/2001 | Kamen et al. |
| 6,225,977 | B1 | | 5/2001 | Li |
| 6,288,505 | B1 | | 9/2001 | Heinzmann et al. |
| 6,302,230 | B1 | | 10/2001 | Kamen et al. |
| 6,311,794 | B1 | * | 11/2001 | Morrell et al. ............... 180/8.3 |
| 6,405,816 | B1 | * | 6/2002 | Kamen et al. ............. 180/65.1 |
| 6,443,251 | B1 | | 9/2002 | Morrell et al. |
| 6,484,829 | B1 | * | 11/2002 | Cox ........................... 180/8.1 |
| 6,538,411 | B1 | | 3/2003 | Field et al. |
| 6,571,892 | B2 | | 6/2003 | Kamen et al. |
| 6,581,714 | B1 | | 6/2003 | Kamen et al. |
| 6,837,327 | B2 | * | 1/2005 | Heinzmann ................. 180/218 |
| 2002/0063006 | A1 | | 5/2002 | Kamen et al. |

FOREIGN PATENT DOCUMENTS

| | | | |
|---|---|---|---|
| DE | 31 28 112 | A1 | 2/1983 |
| DE | 32 42 880 | A1 | 6/1983 |
| DE | 3411489 | A1 | 10/1984 |
| DE | 44 04 594 A 1 | | 8/1995 |
| DE | 196 25 498 C 1 | | 11/1997 |
| EP | 0 109 927 | | 7/1984 |
| EP | 0 193 473 | | 9/1986 |
| EP | 0 537 698 | A1 | 4/1993 |
| EP | 0 958 978 | | 11/1999 |
| FR | 980 237 | | 5/1951 |
| FR | 2 502 090 | | 9/1982 |
| FR | 82 04314 | | 9/1982 |
| GB | 152664 | | 2/1922 |
| GB | 1213930 | | 11/1970 |
| GB | 2 139 576 | A | 11/1984 |
| JP | 52-44933 | | 10/1975 |
| JP | 57-87766 | | 6/1982 |
| JP | 57-110569 | | 7/1982 |
| JP | 59-73372 | | 4/1984 |
| JP | 62-12810 | | 7/1985 |
| JP | 60255580 | | 12/1985 |
| JP | 61-31685 | | 2/1986 |
| JP | 63-305082 | | 12/1988 |
| JP | 2-190277 | | 7/1990 |
| JP | 4-201793 | | 7/1992 |
| JP | 6-171562 | | 12/1992 |
| JP | 5-213240 | | 8/1993 |
| JP | 6-105415 | | 12/1994 |
| JP | 7255780 | | 3/1995 |
| WO | WO 86/05752 | | 10/1986 |
| WO | WO 89/06117 | | 7/1989 |
| WO | WO 96/23478 | | 8/1996 |
| WO | WO 98/46474 | | 10/1998 |
| WO | WO 00 75001 | A | 12/2000 |

OTHER PUBLICATIONS

Schoonwinkel, A., *Design and Test of a Computer-Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Two Dimensional Trajectory Control, Proceeding of the Second International Symposium on Measurement and Control in Robotics*, Japan 1992, pp. 891-898.

Watson Industries, Inc., Vertical Reference Manual ADS-C132-1A, 1992, pp. 3-4.

News article *Amazing Wheelchair Goes Up and Down Stairs*.

Osaka et al., *Stabilization of unicycle, Systems and Control*, vol. 25, No. 3, Japan 1981, pp. 159-166 (Abstract Only).

Roy et al., *Five-Wheel Unicycle System, Medical & Biological Engineering & Computing*, vol. 23, No. 6, United Kingdom 1985, pp. 593-596.
Kawaji, S., *Stabilization of Unicycle Using Spinning Motion*, Denki Gakkai Ronbushi, D, vol. 107, Issue 1, Japan 1987, pp. 21-28 (Abstract Only).
Schoonwinkel, A., *Design and Test of a Computer-Stabilized Unicycle, Dissertation Abstracts International*, vol. 49/03-B, Stanford University 1988, pp. 890-1294 (Abstract only).
Vos et al., *Dynamics and Nonlinear Adaptive Control of an Autonomous Unicycle—Theory and Experiment, American Institute of Aeronautics and Astronautics*, A90-26772 10-39, Washington, D.C. 1990, pp. 487-494 (Abstract only).
TECKNICO'S Home Page, *Those Amazing Flying Machines*, http://www.swiftsite.com/technico.
*Stew'sHovercraft Page*, http://www.stewcam.com/hovercraft.html.
Kanoh, *Adaptive Control of Inverted Pendulum, Computrol*, vol. 2, (1983), pp. 69-75.
Yamafuji, *A Proposal for Modular-Structured Mobile Robots for Work that Principally Involve a Vehicle with Two Parallel Wheels, Automation Technology*, vol. 20, pp. 113-118 (1988).
Yamafuji & Kawamura, *Study of Postural and Driving Control of Coaxial Bicycle, Paper Read at Meeting of Japan Society of Mechanical Engineering* (*Series C*), vol. 54, No. 501, (May 1988), pp. 1114-1121.
Yamafuji et al., *Synchronous Steering Control of a Parallel Bicycle, Paper Read at Meeting of Japan Society of Mechanical Engineering* (*Series C*), vol. 55, No. 513, (May 1989), pp. 1229-1234.

* cited by examiner

FOOTREST TUCK MECHANISM

TECHNICAL FIELD

The present invention pertains to maneuverability improvements to personal transporters including self-propelled wheelchairs.

BACKGROUND OF THE INVENTION

Personal transporters that may be used by handicapped persons, may be self-propelled and user-guidable, and, further, may entail stabilization in one or more of the fore-aft or lateral planes, such as when no more than two wheels are in surface contact at a time. More particularly, such transporters may include one or more clusters of wheels, with wheels in each cluster capable of being motor-driven independently of the cluster in its entirety. One example of such a transporter is described in a patent to Kamen et al., U.S. Pat. No. 5,701,965, which is incorporated herein by reference. The utility of such transporters often depends on the transporter's maneuverability and weight since these transporters frequently need to carry users in confined spaces and for extended periods of time subject to limited battery charges.

SUMMARY OF THE INVENTION

The first embodiment of the invention is a transporter for carrying a payload over a surface. The transporter includes a surface-contacting module, a power base and a support for a payload. The power base is pivotally coupled to the surface-contacting module and the support is pivotally coupled to the power base. The surface-contacting module to which the present invention refers contains at least two surface-contacting elements, such as wheels, and also any structure, such as a cluster arm, for supporting those surface-contacting elements that are in contact with the surface at any particular instant. The power base serves to mechanically couple the surface-contacting module to the payload support. As the power base pivots with respect to the surface-contacting module, the height of the support over the surface changes. The support pivots in a direction opposite to the pivoting of the power base, the support remaining substantially parallel to the surface.

In a further embodiment of the invention, a rest is included to stabilize the payload with respect to the support. The rest is pivotally coupled to the support. In a specific embodiment of the invention, the rest is a footrest for a passenger on the transporter and the support includes a seat for the passenger. The rest is pivotally coupled to the support and power base through a four-bar linkage. In another embodiment, the rest coupled to the support and the powerbase, includes a follower, such as a roller follower, that is fixed with respect to the rest and movable with respect to the power base. The follower transfers part of the load from the rest to the support and/or the power base. The four-bar linkage transfers part of the load from the rest to support and to the powerbase through the lifting arm. The load transfer permits the power base to absorb some of the "shock" which would otherwise need to be borne wholly by the rest or the support, during a front impact to the rest.

In a further specific embodiment of the invention wherein the rest includes a follower, the power base is shaped so that the angle the rest makes with a vertical plane is determined by the rotation of the power base. This rest angle remains constant as the power base rotates until a specific power base rotation angle is attained. The specific angle corresponds to a minimum height of the support above the surface. When the power base is rotated beyond the specific angle, the rest tucks towards the power base. The increased height above the surface of the support and the rest allows the "tucked" rest to continue to clear the surface. This embodiment and the embodiment with the four-bar linkage, advantageously increases the maneuverability of the transporter by tucking the rest inward towards the ground contacting elements, thus, reducing the swing radius of the transporter.

In another specific embodiment of the invention, dual footrests are provided. The control mechanism linking the support height to the rotation of the power base, through the four-bar linkage, can differ for each footrest. Accordingly, it is possible to have independent control mechanisms for each footrest. Alternatively, when using the footrest with a follower, the profile of the power base, where the followers for the respective footrests contact the base can differ for each of the two footrests. This power base profile allows the tucking behavior of one footrest to be tailored differently from the behavior of the other footrest.

In another specific embodiment of the invention, a separate and independent motor is provided to drive a footrest. The motor can drive the coupled footrest to correspondingly move with respect to the power base or support height. With dual footrests, separate and independent motors can provide independent control of each footrest, thus, the footrests correspondingly move with respect to the power base or support height. Accordingly, the motors can enable separate and independent tucking movements for each footrest.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
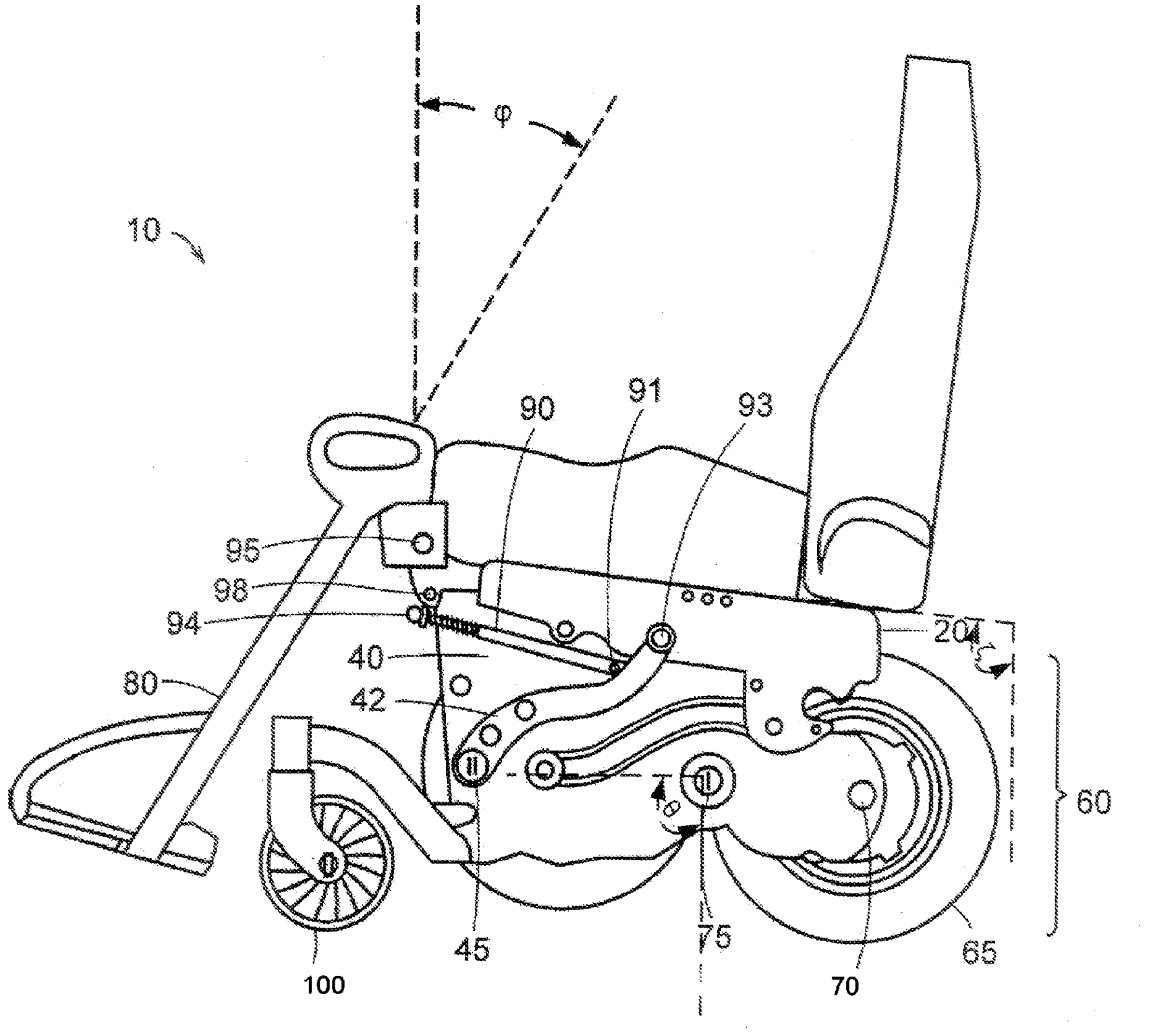
FIG. 1 shows a side view of a self-balancing wheelchair according to a preferred embodiment of the invention with a four-bar linkage.

Referring to FIG. 1, a side view is shown of a personal transporter, in this case a self-balancing wheelchair, designated generally by numeral 10, according to a preferred embodiment of the invention. Transporter 10 may be described in terms of three fundamental structural components: a support 20 for carrying a passenger or other load, a power base 40 to which the support is coupled and a surface-contacting module 60, to which the power base is coupled. The passenger or other load carried by the support 20 may be referred to herein and in any appended claims as a "payload." The surface-contacting module ("SCM") transports support 20 with any payload across the ground, or, equivalently, across any other surface. It has one or more elements that contact the ground, typically a pair of wheels.

The power base 40 includes at least one power source and at least one motor that drive a ground-contacting element. A rest may be provided to aid in preventing the payload from slipping with respect to the support. In the embodiment shown in FIG. 1, a rest 80 is provided for support of a portion of the payload. Rest 80 may be a footrest, for example, for supporting one, or both, of the feet of a passenger.

Kamen '965, column 3, line 55 through column 5, line 44, describes a mechanism and process for automatically balanced operation of wheelchair 10 in an operating position that is unstable with respect to tipping when the motorized drive arrangement is not powered.

Referring further to FIG. 1, the modes of operation described herein apply to transporters having two or more surface-contacting elements 65, where each surface-contacting element is movable about an axis 70, which is substantially parallel to the surface, and where the axis 70 can itself be moved. For example, surface-contacting element 65 may be a wheel, as shown, in which case axis 70 corresponds to an axle about which the wheel rotates. Note that a forward wheel that rotates about axis 72 (shown in FIG. 3) has not been shown for clarity of illustration. In other embodiments of the invention, other surface contacting elements, as are known in the art, may be employed. Active control of the position of the axis 70 about which surface-contacting element 65 rotates may contribute to balancing of the transporter in that the position may be controlled in response to specified conditions of the traversed surface or specified modes of operation of the transporter. Motion of axis 70 of surface-contacting elements 65 is referred to in this description and in any appended claims as "cluster motion." Cluster motion is defined with respect to a second axis 75, also parallel to the surface. Additionally, non-driven wheels may be provided for the transporter, such as caster or pilot wheels 100 coupled to the power base 40, to the support 20 or the rest 80.

As shown in FIGS. 2A through 2E (numbering in FIG. 1), power base 40 rotates about the SCM to which it is coupled by a pivot at axis 75. Support 20 is pivotally coupled to the power base rotating about a support pivot axis 45 that is substantially parallel to the surface. As the power base rotates, support 20 rotates in the opposite direction such that the orientation of the support with respect to the surface remains substantially constant. Rest 80 is pivotally coupled by rest support pivot point 95 to the support 20, rotating about an axis that is also parallel to the surface. In a preferred embodiment, a linkage 90 is pivotally coupled to the rest 80 and the powered lifting arm 42. The linkage 90 may be slidably moveable. A slidably moveable linkage mechanism is useful for increasing, or decreasing the range of the trick and allowing the footrest to freely swing up and away from the seat about the axis of rest support pivot point 95. The arrangement of the following four points of contact form a four bar linkage: the rest support pivot point 95, coupling the rest 80 to the support 20; the rest linkage pivot point 94, coupling the linkage 90 to the rest 80; the lifting arm support pivot point 93, coupling the powered lifting arm 42 to the support 20; and the lifting arm linkage pivot point 91, coupling the linkage 90 to the powered lifting arm 42. The linkage 90, as part of the four-bar linkage, allows the rest to transfer some of the load that would otherwise be borne by the rest support pivot point 95 and the support 20. In other words, if this linkage 90 were not provided, the pivot point attaching the footrest to support 20 would need to be substantially more rugged as is the point of the support at which the pivot is attached, to carry the load. The support and the power base, acting through the linkage, may advantageously serve as a shock absorber for the load on the footrest and support if the wheelchair 10 footrest strikes an object.

Figure 2C:
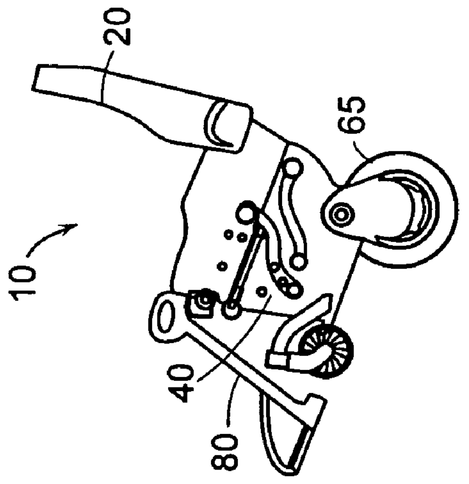
FIGS. 2A–2E show a sequence of side views of the wheelchair with the four-bar linkage as the power base is rotated with respect to the surface-contacting module.
Figure 2B:
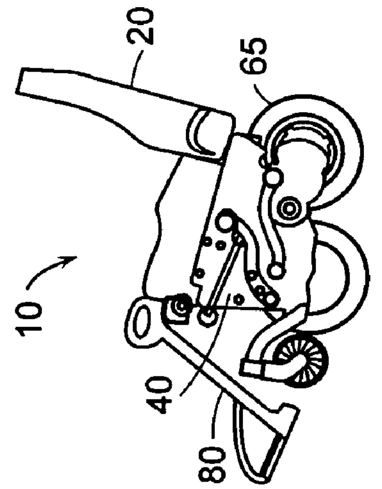
Figure 2A:
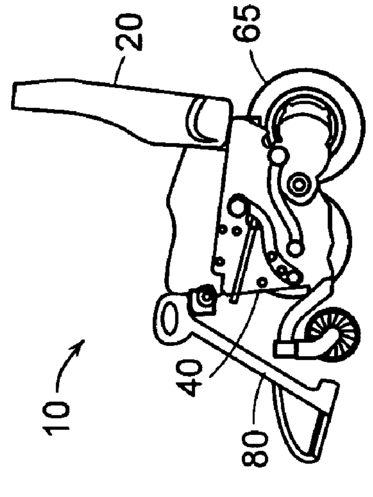
Figure 2E:
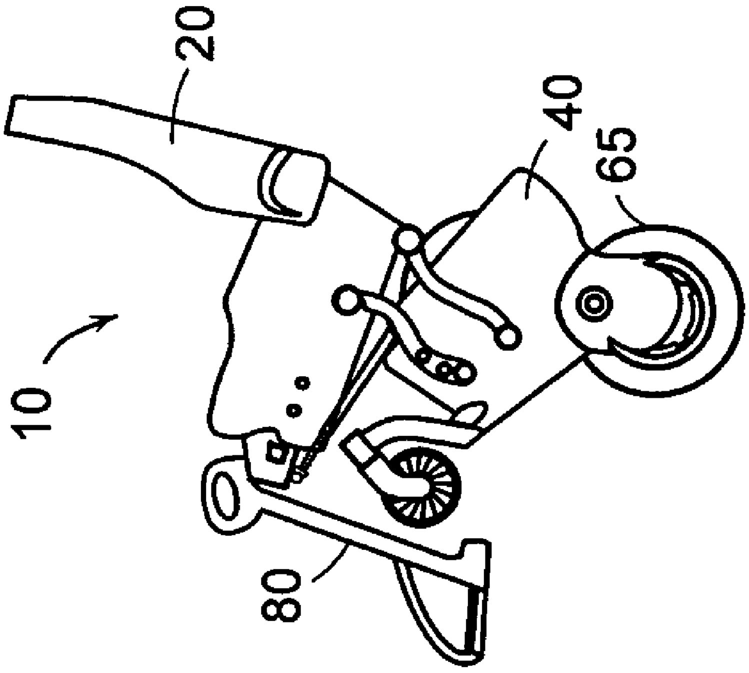
Figure 2D:
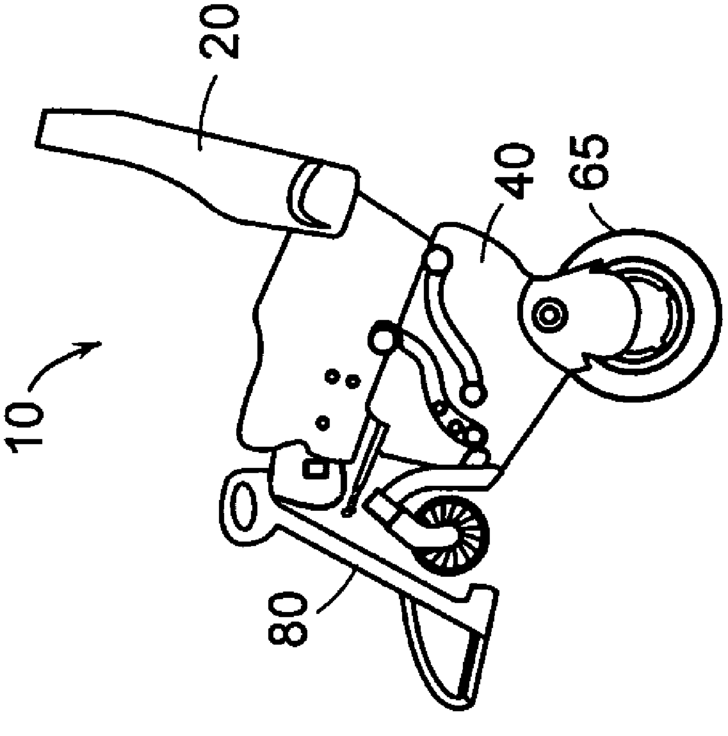

Further, as shown in FIGS. 2A through 2E, the four bar linkage, allows the footrest to maintain its pivot angle, $\phi$, substantially constant with respect to a vertical plane until the seat is raised to a specified height above the surface. This feature allows the footrest to clear a curb as shown in FIG. 2B. Above this specified height, the footrest begins to rotate towards the vertical, i.e., $\phi$ decreases. Thus, the footrest "tucks" towards the power base. Operationally, as the powerbase pivots to raise the support height, the powered lifting arm coupled to the linkage, pulls back the linkage. The linkage subsequently pulls back the pivotably coupled footrest towards the powerbase to tuck the footrest. The tuck of the footrest improves the maneuverability of the wheelchair by reducing the radius about which the footrest swings as the wheelchair turns. As the power base is rotated in the opposite direction, the height of the support above the surface decreases. When the specified height is reached, the footrest begins to pivot, increasing $\phi$. Thus, the clearance of the footrest above the surface is maintained.

A stop 98 may be provided to inhibit rotation of the footrest past a specified angle to the vertical plane, facilitating rider comfort. In a preferred embodiment with a stop, when the transporter hits an obstacle, the force is transferred to the support 20. This force transfer may result in a better distribution of the load. In an alternate embodiment, the stop can be placed on either the support 20, at the point where the footrest is coupled to the support, or on the power base of the device.

Figure 3:
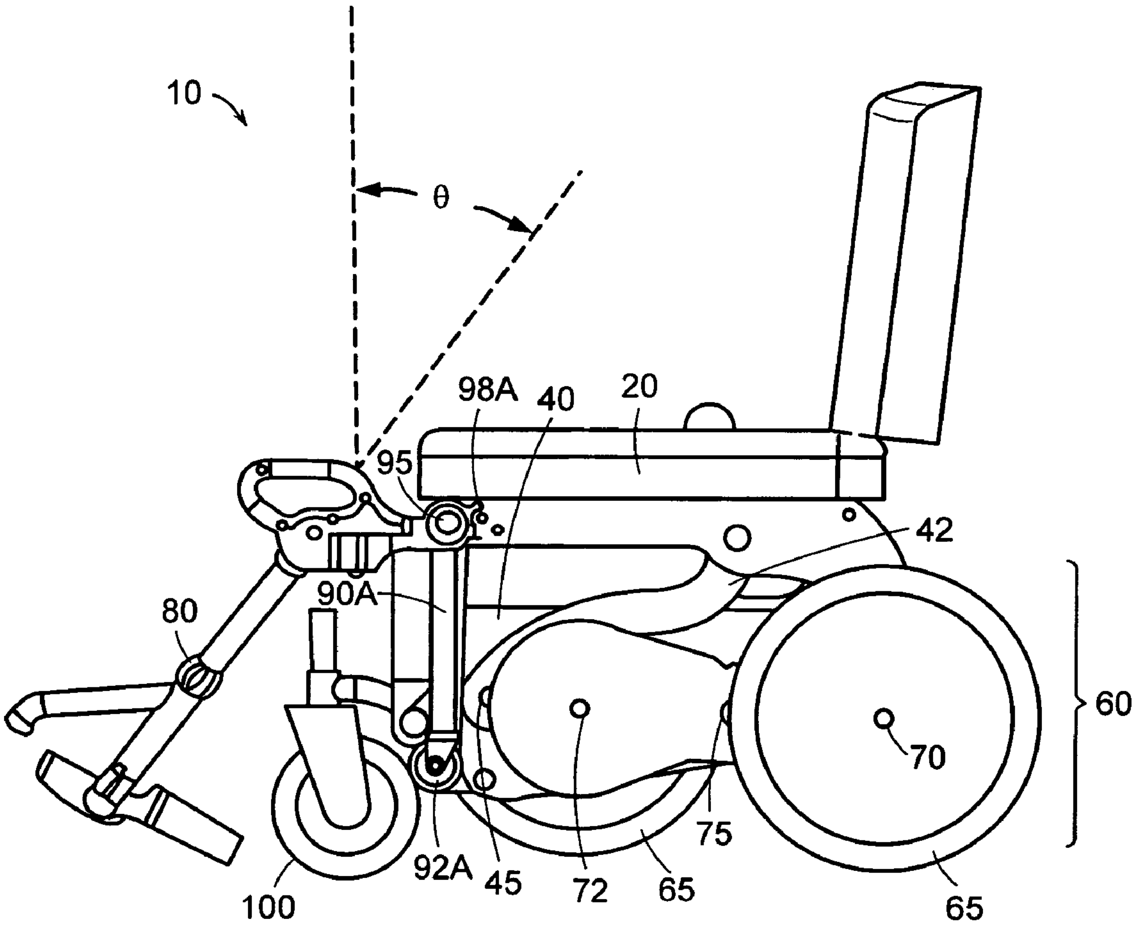
FIG. 3 shows a side view of a self-balancing wheelchair according to an embodiment of the invention with a follower.
Figure 4C:
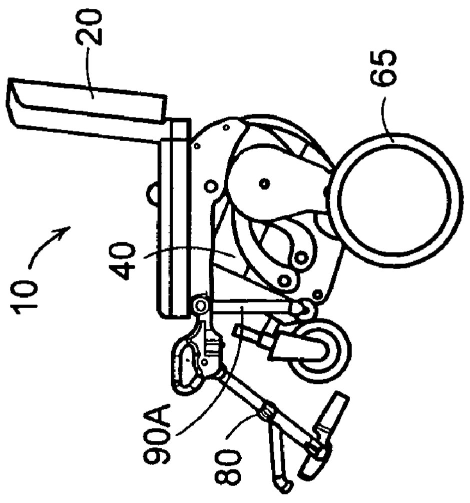
FIGS. 4A–4F show a sequence of side views of the wheelchair with the follower as the power base is rotated with respect to the surface-contacting module.
Figure 4B:
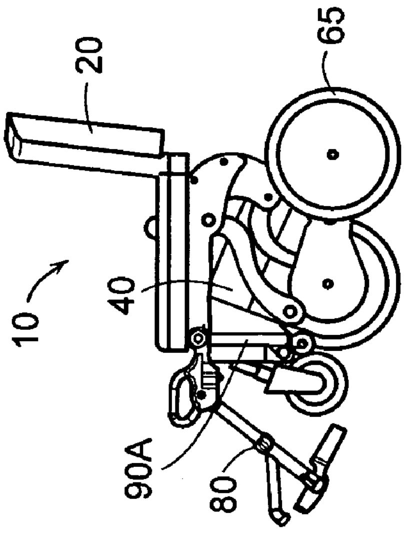
Figure 4A:
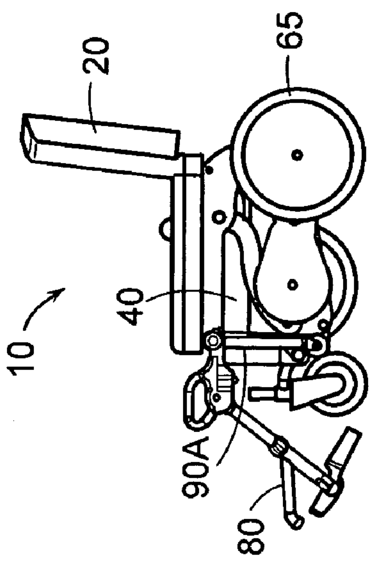
Figure 4F:
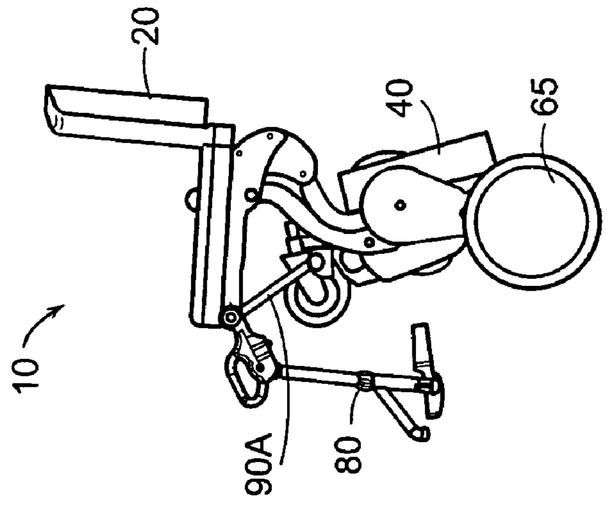
Figure 4E:
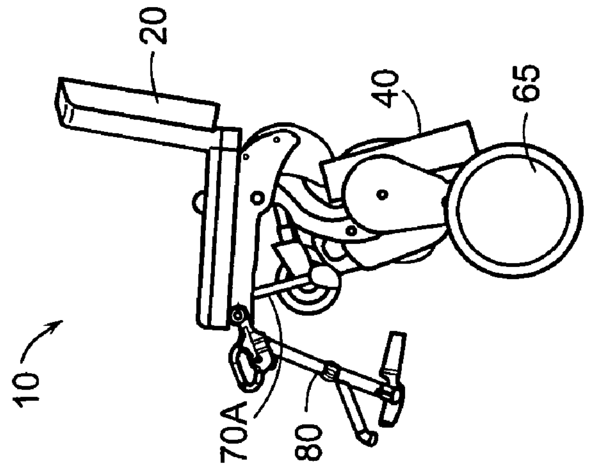
Figure 4D:
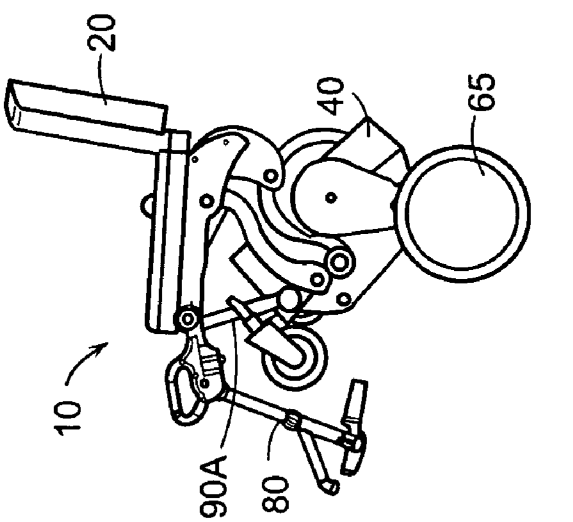

In an alternate embodiment as shown in FIG. 3, a follower 90A, rigidly coupled to the footrest 80 and moveably coupled to the powerbase 40 through a guidewheel 92A, can attain similar functions as the four-bar linkage described above. FIG. 3 shows a side view of a self-balancing wheelchair according to an embodiment of the invention with the follower 90A. As shown in FIGS. 4A through 4F and analogous to the four-bar linkage, the follower allows the power base to offload some of the load that would otherwise be borne by the pivot point and the support. In other words, if this follower were not provided, the pivot point attaching the footrest to the support would need to be substantially more rugged as would the point of the support at which the pivot is attached, to carry the load. The power base via the follower advantageously acts as a shock absorber for the load on the footrest and support if the wheelchair 10 footrest strikes an object.

FIGS. 4A through 4F, also show the operation of the follower embodiment of the invention. Here, the follower allows the footrest to maintain its pivot angle, $\phi$, substantially constant with respect to a vertical plane until the seat is raised to a specified height above the surface. This feature allows the footrest to clear a curb as shown FIG. 4B. Above this specified height, the footrest begins to rotate towards the vertical, i.e., $\phi$ decreases. Thus, the footrest "tucks" towards the power base. The tuck of the footrest improves the maneuverability of the wheelchair by reducing the radius about which the footrest swings as the wheelchair turns. As the power base is rotated in the opposite direction, the height of the support above the surface decreases. When the specified height is reached, the footrest begins to pivot, increasing $\phi$. Thus, the clearance of the footrest above the surface is maintained. Similarly, a stop 98A, as shown in FIG. 3, may attain all the advantages of the invention as described above.

In another embodiment of the invention, dual footrests are provided. Each footrest is pivotally coupled 95 to the support 20, rotating about an axis that is substantially parallel to the surface. In a preferred dual footrests embodiment, individual linkages 90 and the corresponding four-bar linkages, are pivotally coupled to each footrest and the power base. In an alternate embodiment with followers, the individual followers 90A are rigidly coupled to each footrest and movably coupled to the power base through each follower's guide wheel 92A. The profile of the power base where the guide wheels of the followers contact the base can differ for each of the footrests. In the dual footrests embodiment, the control mechanism for each of the footrests may differ and thus the footrests may operate independently. In this embodiment, one footrest may tuck towards the power base differently than the other as the support is raised above this surface. This embodiment can be used advantageously, for example, to reduce the radius about which the footrest swings if one leg of a user differs from the other. Examples of this situation would be for amputees or users with a leg in a cast.

In another embodiment, the footrest 80 is pivotally coupled 95 to the support 20, rotating about an axis that is also parallel to the surface. The footrest may have an independent motor driving it. The motor may drive the footrest to correspondingly move with the support height. In this embodiment, each footrest can have a separate motor as described above to enable independent control of the footrest correspondingly move with the support height. Such independent movements may also achieve the advantages of the dual footrests embodiment described above.

While the description of the preceding embodiments have described the transporter as a self-balancing wheelchair, the described embodiments are intended to be merely exemplary and numerous variations and modifications will be apparent to those skilled in the art. For example, the transporter need not be self-balancing and may include surface-contacting elements that stabilize the transporter to tipping in a fore-aft or lateral plane at substantially all times, e.g., a four wheeled wheelchair. The support may not include a seat for a passenger, but may include other devices for supporting a payload. The rest may be any device that tends to stabilize the payload with respect to the support.

Other variations and modifications are intended to be within the scope of the present invention as defined in the appended claims.

What is claimed is:

1. A transporter for carrying a payload over a surface, the transporter comprising:

a. a surface-contacting module for traversing the surface;

b. a power base including at least one power source and at least one motor for powering the surface-contacting module, the power base pivotally coupled to the surface-contacting module about a base pivot axis, the base pivot axis substantially parallel to the surface, the base characterized by a base pivot angle with respect to the surface-contacting module;

c. a support for supporting the payload, the support pivotally coupled to the power base about a support pivot axis, characterized by a support pivot angle with respect to the vertical plane;

d. a mechanical linkage for maintaining the support pivot angle substantially constant as the power base pivots with respect to the surface-contacting module; and e. a rest for partial support of the payload, the rest pivotally coupled to the support about a rest pivot axis, the rest pivot axis substantially parallel to the surface and defining a rest pivot angle with respect to the vertical plane;

wherein the rest pivot angle is less than a specified angle when the support pivot axis is above a specified height and wherein the rest pivot angle is greater than the specified angle when the support pivot axis is below the specified height.

2. The transporter according to claim 1, further comprising a linkage, coupling the rest to the power base in such a manner as to vary the rest pivot angle as a function of the base pivot angle.

3. A transporter according to claim 1, wherein the rest further includes a stop such that the rest pivot angle is at least a specified angle.

4. A transporter according to claim 1, wherein the rest is a footrest for supporting a foot of a user.

5. A transporter according to claim 1, further including a caster coupled to the power base in such a manner as to be capable of being brought into engagement with the surface during operation of the transporter.

6. A transporter for carrying a payload over a surface, the transporter comprising:

a. a surface-contacting module for traversing the surface;

b. a power base including at least one power source and at least one motor for powering the surface-contacting module, the power base pivotally coupled to the surface-contacting module about a base pivot axis, the base pivot axis substantially parallel to the surface, the base characterized by a base pivot angle with respect to the surface-contacting module;

c. a support for supporting the payload, the support pivotally coupled to the power base about a support pivot axis, characterized by a support pivot angle with respect to the vertical plane; and d. a mechanical linkage for maintaining the support pivot angle substantially constant as the power base pivots with respect to the surface-contacting module;

e. a rest for partial support of the payload, the rest pivotally coupled to the support about a rest pivot axis, the rest pivot axis substantially parallel to the surface and defining a rest pivot angle with respect to the vertical plane; and f. a roller follower for governing the rest pivot angle as a function of the base pivot angle.

7. A transporter for carrying a payload over a surface, the transporter comprising:

a. a surface-contacting module for traversing the surface;

b. a power base including at least one power source and at least one motor for powering the surface-contacting module, the power base pivotally coupled to the surface-contacting module about a base pivot axis, the base pivot axis substantially parallel to the surface, the base characterized by a base pivot angle with respect to the surface-contacting module;

c. a support for supporting the payload, the support pivotally coupled to the power base about support pivot axis, characterized by a support pivot angle with respect to the vertical plane; and d. a mechanical linkage for maintaining the support pivot angle substantially constant as the power base pivots with respect to the surface-contacting module;

e. a rest for partial support of the payload, the rest pivotally coupled to the support about a rest pivot axis, the rest pivot axis substantially parallel to the surface and defining a rest pivot angle with respect to the vertical plane; and f. a motor, coupled to the rest, for driving the rest to move with respect to the support such that the rest pivot angle with respect to the vertical plane varies as the power base pivots with respect to the surface-contacting module.

* * * * *